Patented June 21, 1949

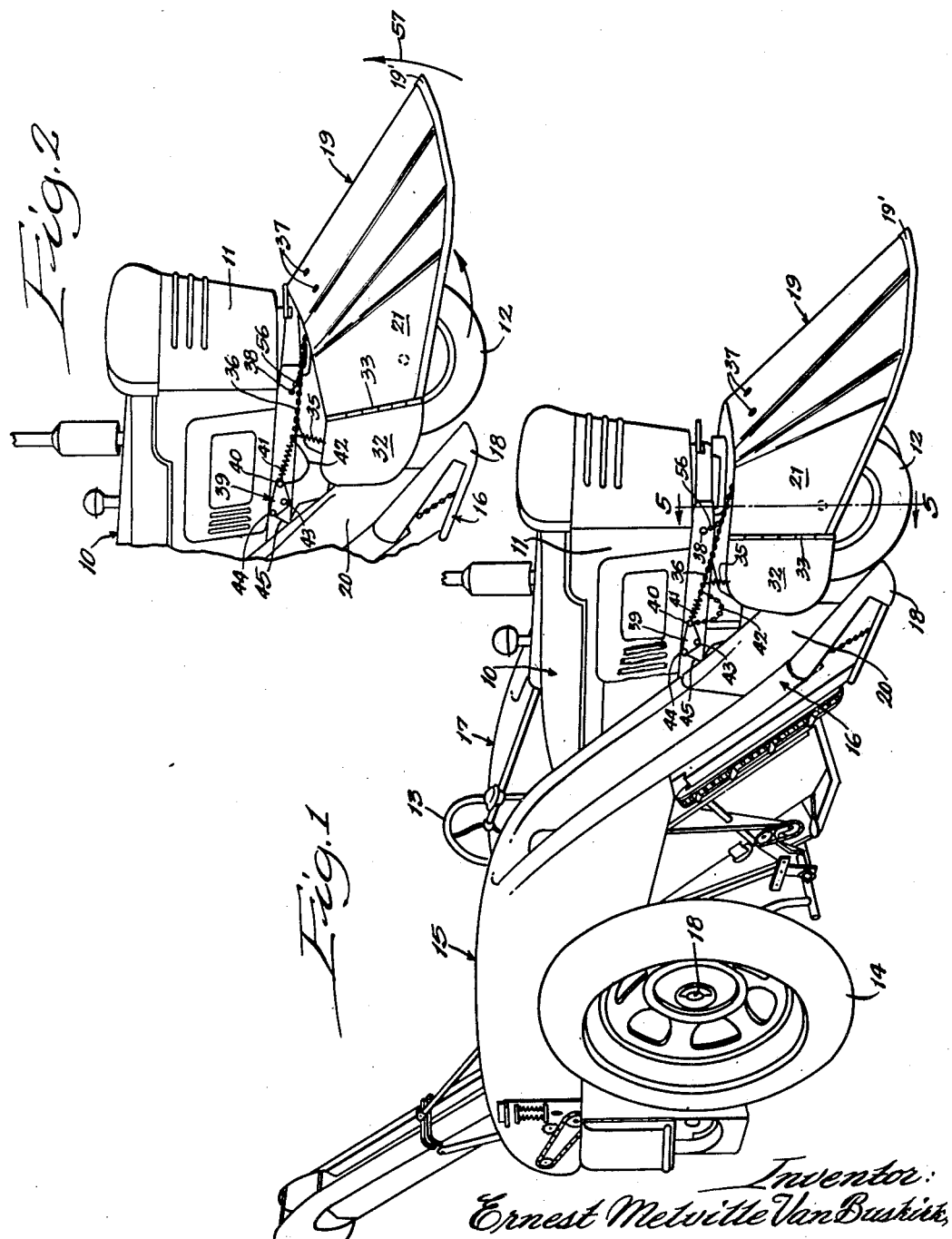

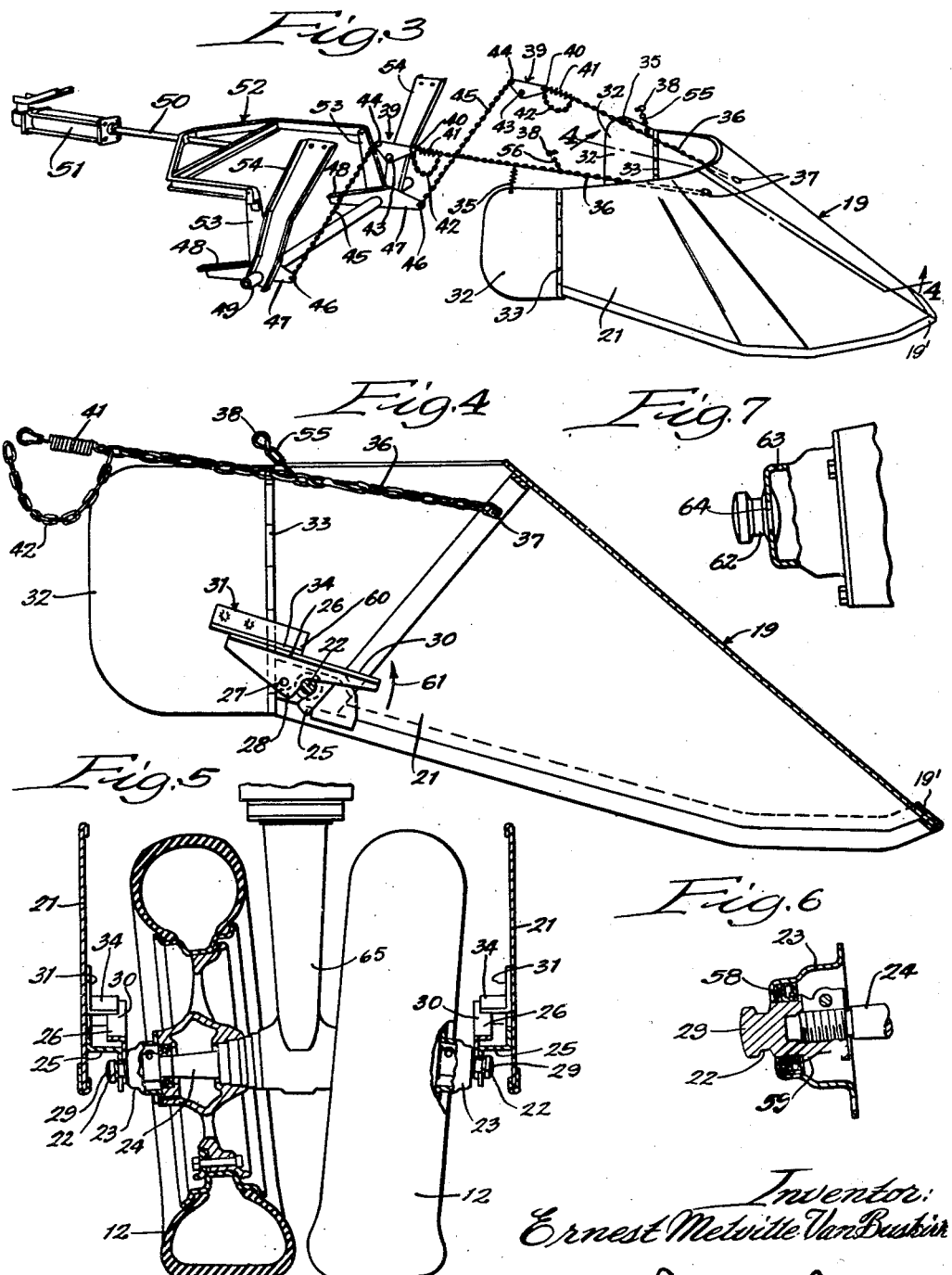

2,473,978

UNITED STATES PATENT OFFICE 2,473,978

CENTER DIVIDER FOR TRACTOR-MOUNTED HARVESTERS

Ernest Melville Van Buskirk, East Moline, Ill., assignor to International Harvester Company, a corporation of New Jersey Application May 25, 1945, Serial No. 595,696

5 Claims. (Cl. 56—119)

This invention relates to a new and improved center divider for tractor-mounted harvesters and has for one of its principal objects the provision of means for raising the divider upon turning of the tractor's dirigible wheels and also of means for raising the divider upon tilting of the harvester with respect to the tractor.

An important object of this invention is to provide a center divider point for a tractor-mounted corn picker which is mounted for relative rotational movement with the dirigible wheels of a tricycle tractor and for concurrent movement through the steering angle.

Heretofore, center divider points for harvesters such as corn pickers, ensilage harvesters, and cotton pickers have primarily been mounted on the harvester and would, therefore, necessarily move as a unit with all the remaining parts of the harvester. In some machines, the center divider point has been mounted rigidly with the tractor and would extend downwardly from the engine of the tractor as a skirt. In either instance—that is, where the center point was a part of the corn picker or a part of the tractor—it was essential that the divider point be sufficiently wide at its point of covering the dirigible wheels to permit full steering of the dirigible wheels. With the use of a wide center divider, it was necessary to plant the rows of corn farther apart, or such a wide divider would necessitate conveying the stalks of corn in a line other than the natural row line. In still other cases, the necessarily large center divider point caused shifting of the outer gathering points on the corn picker to such an extent that the crop-treating portion of the corn picker either had to go over the rear traction wheels, or in order to get in between the rear traction wheels, the outer gathering points had to be shortened and curved inwardly so that the throat of the machine would actually be in behind the wide portion of the center gathering point.

It is, therefore, an important object of this invention to provide a center gathering point which will be relatively narrow and which will permit harvesting and treating of row crops in a straight line.

A still further important object is to provide a tractor-mounted corn picker having a center dividing point journaled on the hubs of the dirigible wheels so that the wheels are permitted rotation without affecting the divider point, and yet during steering of the dirigible wheels the divider points will move as a unit with the wheels.

Another and still further important object is the provision of means for automatically raising a center divider point for a tractor-mounted corn picker upon turning of the tractor dirigible wheels in either direction from a straight line. During harvesting of corn it is essential that the center divider point either ride on the ground or be positioned very close to the ground so that stalks which have been bent over will be scooped up and carried into the machine for harvesting. After the corn picker or harvesting machine has reached the end of a row and it is necessary that the machine be turned around for operation of an adjacent row in the opposite direction, the tractor is turned through the medium of dirigible wheels and during such turning it has been found that the center divider point is often bent or twisted due to some unforeseen obstacle at the end of the field. Hence, a raising of the divider point upon rotation of the tractor dirigible wheels is vitally important to the successful operation of the corn picker.

Still another object is to provide an interconnection for a tractor-mounted center divider point with the lifting means for a tractor-mounted corn picker so that in spite of the fact that the center divider point is a separate unit from the corn picking unit, it may be raised or lowered as a unit with the corn picker.

Other and further important objects will become apparent from the following specification and accompanying drawings in which:

Figure 1 is a perspective view of a tractor-mounted corn picker incorporating the particular center divider of this invention;

Figure 2 is another perspective view showing a portion of the device shown in Figure 1, with the center divider point raised during turning of the tractor;

Figure 3 is a perspective view of the center divider point removed from the tractor and shown arranged and connected to the tractor power lift;

Figure 4 is a sectional view taken on the line 4—4 of Figure 3;

Figure 5 is a sectional taken on the line 5—5 of Figure 1 with one of the symmetrical tires shown in full lines;

Figure 6 is an enlarged detail sectional view of a portion of the device shown in Figure 5; and Figure 7 is a modification of the device shown in Figure 6.

As shown in the drawings:

The reference numeral 10 indicates generally a farm tractor having a relatively narrow longitudinal body 11 which includes the tractor engine at the forward end thereof. The front end of the body 11 is supported by a pair of closely positioned wheels 12 adapted to be turned through angular movement by a steering wheel 13 and as a result cause steering of the tractor. The rear portion of the tractor is supported by relatively widely spaced traction wheels 14. This tricycle tractor having the steering or dirigible wheels in the front and center thereof is a standard farm tractor capable of receiving tools for row-crop planting, cultivating and treating, such as harvesting.

As shown in Figure 1, a corn picker 15 having a pair of gathering units 16 and 17 is positioned adjacent the elongated tractor body 11 and extends rearwardly over the rear tractor axle 13 and between the traction wheels 14 and the body 11.

The gathering units 16 and 17 have outer gathering points 18 only one of which is shown in Figure 1 of the drawings. These outer gathering points 18 are adapted to run on the outside of a row-crop such as corn or the like, and guide the standing corn into a throat portion of the corn picking unit. It is necessary to have an inner gathering point, but when the corn picker is mounted on a tractor it is very difficult to have an inner gathering point because of the lack of available space. In lieu of the inner gathering point on the gathering units 16 and 17, a center divider 19 having a point 19' is provided between the units 16 and 17, and this single center divider 19 acts as the inner gathering point for each of the gathering units 16 and 17. As previously stated, the center divider is usually in the form of a fixed skirt depending from the longitudinal body 11 of the tractor or is made a fixed part of the corn picking units which divider in the latter case causes great difficulty in mounting the corn picker on the tractor. As shown in Figure 1, the gathering unit 16 is equipped with an inner wall or shield portion 20 which forms a rearward continuation of the center divider 19.

As best shown in Figures 4 and 5, the center divider 19 has skirt portions 21 which are adapted to engage stub shafts 22 projecting outwardly through hub caps 23 of the dirigible wheels 12. The wheels 12 rotate about stationary transverse axles 24 and hence do not interfere with the attachment of the center divider 19 inasmuch as the stub shafts 22, as best shown in Figure 6, are threadedly engaged to the stationary axles 24 and project through holes in the sides of the hub caps 23. A standard oil seal 58 is positioned between the hub cap 23 and a shoulder 59 on the stub shaft 22. Bracket-like projections 25 are welded or otherwise attached within the skirt portions 21 of the divider and, as best shown in Figure 4, do not completely encircle the stub shafts 22 but merely project down and around past the center at the bottom thereof. In order to securely fasten the divider in a fixed position about the stub shafts 22, locking members 26 hinged at 27 have downwardly projecting portions 28 which are adapted to closely engage the stub shafts 22 and thus supplement the bracket 25 in the support of the divider on these stub shafts 22. These short shafts 22 have flanges 29 at their outer ends which prevent outward movement of the divider's side sheets 21. The upper edge 30 of the locking member 26 is turned over to form a ledge, the upper surface of which is in contact with a stop member 31 which is riveted, welded or otherwise attached to a flap 32 hinged on a vertical axis at 33 to the center divider side sheets 21. This stop 31 extends forwardly, as shown at 60, over the hinge point 27 and has an inturned ledge 34 which extends inwardly toward the tractor dirigible wheels 12 as shown in Figure 5. The stop 31 prevents swinging of the member 26 about its pivot 27 in the direction indicated by the arrow 61, and therefore, until such time as the flaps 32 are swung laterally outwardly and the extension 60 of the stop 31 is removed from its position above the ledge 30, the member 26 remains in fixed locking position.

Figure 7 shows a modification of a stub shaft 62 attachment to the dirigible wheel structure.

The stub shaft 62 is riveted or welded or otherwise attached to the hub cap 63 at 64 and hence rotates with the dirigible wheels. The stub shaft surrounding members 25 and 26 will then journally engage the shaft 62. It is obvious that the journal engagement will be fully as effective as the engagement with the stationary stub shaft.

The rearwardly extending vertically hinged flaps 32, as best shown in Figures 1 and 2, are adapted to extend between the center divider 19 and the inner walls 20 of the picker units to maintain a constant shiftable continuous wall surface. When the tractor is turned through the medium of the dirigible wheels 12, the center divider 19 will move with the wheels 12, but in spite of this the hinged flaps 32 shift laterally and maintain their contact with the inner walls or shields 20. The purpose of the flaps contacting the inner walls 20 is to prevent stalks of corn from going into any other place than the throat of the gathering units defined by the gathering point 18 and the inner wall 20.

As stated above, it is one of the objects of this invention to cause the center divider 19 to be raised when the tractor is turned in either direction and also when the corn picker gathering units are raised. Chains 36 are attached at their forward ends at 37 to a central point on the divider 19 at a position spaced forwardly of the hinge of the center divider and extend rearwardly to one connection at 38 to the tractor body 11. As the dirigible wheels are turned for steering about the vertical axis or bolster 65 of the dirigible wheels, the substantially horizontally disposed axles 24 shift from a normally transverse position to some angular position with respect to the longitudinal direction of tractor travel. The center divider 19 is hingedly carried on the horizontal axis of the axles 24. The chains 36 are fixed length tension elements and are connected at one end to a point on the tractor above the horizontal axis of the shield and at a position spaced from the vertical steering axis. The other ends of the chains 36 are connected to the center divider or shield at points spaced forwardly of the horizontal axis. Steering of the dirigible wheels in one or both directions will cause the center divider to raise about its horizontal hinge axis as the fixed length chains 36 prevent the center divider from freely following the turning of the dirigible wheels. The attachment of the chain to the tractor at a position spaced from the vertical steering axis 65 causes the center divider 19 and chains 36 to swing about different radii. In a normal forward position of the shield 19 the arcs of the two radii intersect, but as soon as turning of the dirigible wheels begins the arcs separate causing one of the chains 36 to become taut and pull upwardly on the center divider and the other chain 36 to become loose. The crop raising and deflecting element 19 thus swings upwardly about its horizontal hinge axis to automatically move upwardly from its ground following position upon turning of the dirigible wheels in either direction. Another branch of the chain extends rearwardly to one arm of a lever 39 at 40. A spring 41 is interposed in the chain 36 just forwardly of the connection 40. A branch of the chain 36 shown at 42 joins the main portion of the chain 36 to the connection 40 so that if under any circumstances the spring should break, the chain portion 42 will prevent complete disengagement of the divider 19. The lever 39 is pivoted at 43 on the side of the front portion of the tractor body 11 and has another arm having a connection 44 for a chain 45 extending downwardly and rearwardly to a connection 46 on a power-operated swinging arm 47.

The picking units 16 and 17 must necessarily be raised or lowered depending on the height at which the corn is to be picked, and for this purpose power-operated arms 48 are swingable about a supporting pipe 49 by reason of extension or retraction of a piston 50 in a hydraulic cylinder 51. The piston 50 as it moves forwardly or rearwardly, acts to move a fork or yoke member 52 which pivotally engages substantially upright arms 53 fixed to the pipe 49. The pipe is maintained in position by means of supporting arms 54 depending from the tractor body 11. The power-operated lever arms 47 are forward extensions of the power-operated lever arms 48. These arms 48 are adapted to engage a cross member extending between the corn picking units, and as the arms 48 are raised or lowered the picking units are simultaneously raised and lowered. It will be apparent that as the arms 48 move the arms 47 also move, and the chains 45 upon raising of the corn picking units will pull downwardly on the lever 39 about its pivot 43, thus effecting an upward and rearward movement of the chain 36. Such a movement will cause a lifting of the center divider 19 about the stub shafts 22 as hinges. Therefore, the center divider 19 and the outer gathering points 18 will remain at similar heights even when the gathering units are changed to new operating levels.

It was also stated above that as the tractor is turned the center divider 19 is raised. Assuming, for example, that the tractor dirigible wheels 12 are turned in a rightward direction, it will be evident that an extension 55 of the chain 36, which is on the left side of the center divider 19 as viewed from the rear or the tractor driver's position, will be pulled tight and continued turning of the wheels 12 in a rightward direction will cause an upward pulling on the points of connection 37, so that the center divider 19 will raise. Conversely, when the tractor is turned in a leftward direction, an extension 56 of the chain 36, which is on the right side of the divider 19 as viewed from the rear, will be pulled tight and eventually cause a raising of the divider point 19. In other words, during turning of the tractor dirigible wheels 12, the chain on one side will be pulled tight, and on the other side the chain will be given excessive slack but despite the direction of turning one chain will always be tight so that the gathering point 19 will lift regardless of whether the turning is to the right or to the left. The effect of the turning of the dirigible wheels 12 in a leftward direction is shown in Figure 2 in which the extension 56 of the chain 36 is pulled tightly as it is extended and thus causes the divider point 19 to be raised as indicated by the arrow 57.

Numerous details of construction may be varied throughout a wide range without departing from the principles herein disclosed, and I do not therefore propose limiting the patent granted hereon otherwise than as necessitated by the appended claims.

What is claimed is:

1. In a tricycle type tractor having a narrow longitudinally extending body supported at its front by a narrow dirigible wheel structure and at its rear by widely spaced traction wheels, a harvester mounted on said tractor between one traction wheel and the body and having a forwardly extending gathering unit positioned closely adjacent the body of the tractor and terminating adjacent the dirigible wheel structure, a crop raising and deflecting means attached to said dirigible wheel structure and extending forwardly and downwardly therefrom for closely following the ground and for engaging crops to be harvested and directing them into the path of the gathering unit, and a rearwardly extending flap hinged on a substantially vertical axis to said crop raising and deflecting means, said flap being of sufficient length to overlie the forward portion of the gathering unit, whereby a continuous guiding contact surface is provided for crops being lifted and deflected with different angular positions of the dirigible wheel structure.

2. The structure set forth in claim 1 in which resilient means are provided for maintaining the flap in contact with the gathering unit.

3. The structure set forth in claim 1 in which the crop raising means is pivoted on a transverse axis for lifting and lowering of the ground following portion.

4. The structure set forth in claim 3 in which means are connected to the crop raising and deflecting means and the tractor for lifting the crop raising means when the dirigible wheel structure is turned in either direction.

5. In a tricycle-type tractor having a narrow longitudinally extending body supported at its front by a narrow dirigible wheel structure mounted on a substantially vertical steering axis and supported at its rear by widely spaced traction wheels, a crop raising and deflecting element hingedly attached to said dirigible wheel structure on a substantially horizontal axis and extending forwardly and downwardly therefrom for closely following the ground and for engaging crops, and crop raising and deflecting element tilting means connected to the tractor spaced from the vertical steering axis and to the crop raising and deflecting element spaced from the horizontal hinging axis, said means comprising a fixed length flexible element disposed lengthwise at each side of the tractor body, said elements having their front ends connected to the deflecting element at points forwardly of the vertical steering axis and above said horizontal axis and their rear ends connected respectively at opposite sides of the tractor at points substantially to the rear of the vertical steering axis, whereby when the steering wheels are angled to one side or the other for steering the tractor and the deflecting element turns therewith, one or the other of said flexible elements depending upon the direction of steering movement is made taut and exerts a pull to raise said deflecting element automatically a substantial distance above the ground and after the tractor turn has been made and again operates on the straight-away permits the deflector to fall and return to normal crop engaging position.

ERNEST MELVILLE VAN BUSKIRK.

REFERENCES CITED

The following references are of record in the file of this patent:

UNITED STATES PATENTS

| Number | Name | Date |
| --- | --- | --- |
| 878,561 | Ramsey | Feb. 11, 1908 |
| 1,811,054 | Kipp et al. | June 23, 1931 |
| 1,836,767 | Niemann et al. | Dec. 15, 1931 |
| 2,284,909 | Kuhlman | June 2, 1942 |